(12) United States Patent
Davidson et al.

(10) Patent No.: US 10,926,489 B2
(45) Date of Patent: Feb. 23, 2021

(54) METHODS AND COMPOSITIONS FOR COMPRESSION MOLDING

(71) Applicant: Arris Composites Inc., Berkeley, CA (US)

(72) Inventors: Erick Davidson, Piedmont, CA (US); Ethan Escowitz, Berkeley, CA (US)

(73) Assignee: Arris Composites Inc., Berkeley, CA (US)

( * ) Notice: Subject to any disclaimer, the term of this patent is extended or adjusted under 35 U.S.C. 154(b) by 51 days.

(21) Appl. No.: 16/509,801

(22) Filed: Jul. 12, 2019

(65) Prior Publication Data

US 2020/0016846 A1 Jan. 16, 2020

Related U.S. Application Data

(60) Provisional application No. 62/697,070, filed on Jul. 12, 2018.

(51) Int. Cl.
| | |
|---|---|
| *B29C 70/54* | (2006.01) |
| *B29C 70/34* | (2006.01) |
| *B29C 70/20* | (2006.01) |
| *B29C 70/46* | (2006.01) |
| *B29K 307/04* | (2006.01) |
| *B29K 101/12* | (2006.01) |

(52) U.S. Cl.
CPC ......... *B29C 70/345* (2013.01); *B29C 70/207* (2013.01); *B29C 70/46* (2013.01); *B29C 70/543* (2013.01); *B29K 2101/12* (2013.01); *B29K 2307/04* (2013.01)

(58) Field of Classification Search
CPC . B29C 2043/182; B29C 70/40; B29C 70/543; B29C 70/546; B29C 70/548; B29C 70/14; B29C 70/34; B29C 70/345; B29C 70/62
See application file for complete search history.

(56) References Cited

U.S. PATENT DOCUMENTS

| | | |
|---|---|---|
| 4,044,188 A | 8/1977 | Segal |
| 4,051,290 A | 9/1977 | Jutte et al. |
| 4,353,857 A | 10/1982 | Ray et al. |

(Continued)

OTHER PUBLICATIONS

Authorized Officer Catherine Comte, International Search Report and Written Opinion dated Oct. 22, 2019 issued in PCT Application No. PCT/US2019/041565.

*Primary Examiner* — Timothy Kennedy
*Assistant Examiner* — Alexander A Wang
(74) *Attorney, Agent, or Firm* — Kaplan Breyer Schwarz, LLP

(57) ABSTRACT

A method for forming fiber-reinforced composite parts via compression molding, particularly useful for forming parts that include off-axis, out-of-plane, or small, intricate features. In accordance with the method, non-flowing continuous fiber bundles and flowing continuous fiber bundles are placed in a mold, wherein the flowing continuous fiber bundles are disposed proximal to a minor feature. The non-flowing bundle has a length about equal to the length of a major feature of the mold. The flowing bundle has a length that is somewhat longer than the length of the minor feature. Under heat and pressure, resin softens and fibers from the flowing continuous fiber bundles flow into the minor feature.

29 Claims, 12 Drawing Sheets

(56) References Cited

U.S. PATENT DOCUMENTS

| | | | | |
|---|---|---|---|---|
| 4,923,203 A | * | 5/1990 | Trimble | B62K 3/08 |
| | | | | 280/281.1 |
| 2003/0026928 A1 | * | 2/2003 | Bryant | F16L 11/081 |
| | | | | 428/36.3 |
| 2003/0054150 A1 | * | 3/2003 | Evans | B29C 70/50 |
| | | | | 428/297.4 |
| 2006/0165955 A1 | | 7/2006 | Ruegg et al. | |
| 2007/0205053 A1 | * | 9/2007 | Isham | B29C 43/003 |
| | | | | 182/207 |
| 2013/0189478 A1 | * | 7/2013 | Fisher, Jr. | B29C 70/545 |
| | | | | 428/114 |
| 2015/0284886 A1 | * | 10/2015 | Ohtani | B29C 70/20 |
| | | | | 428/365 |

\* cited by examiner

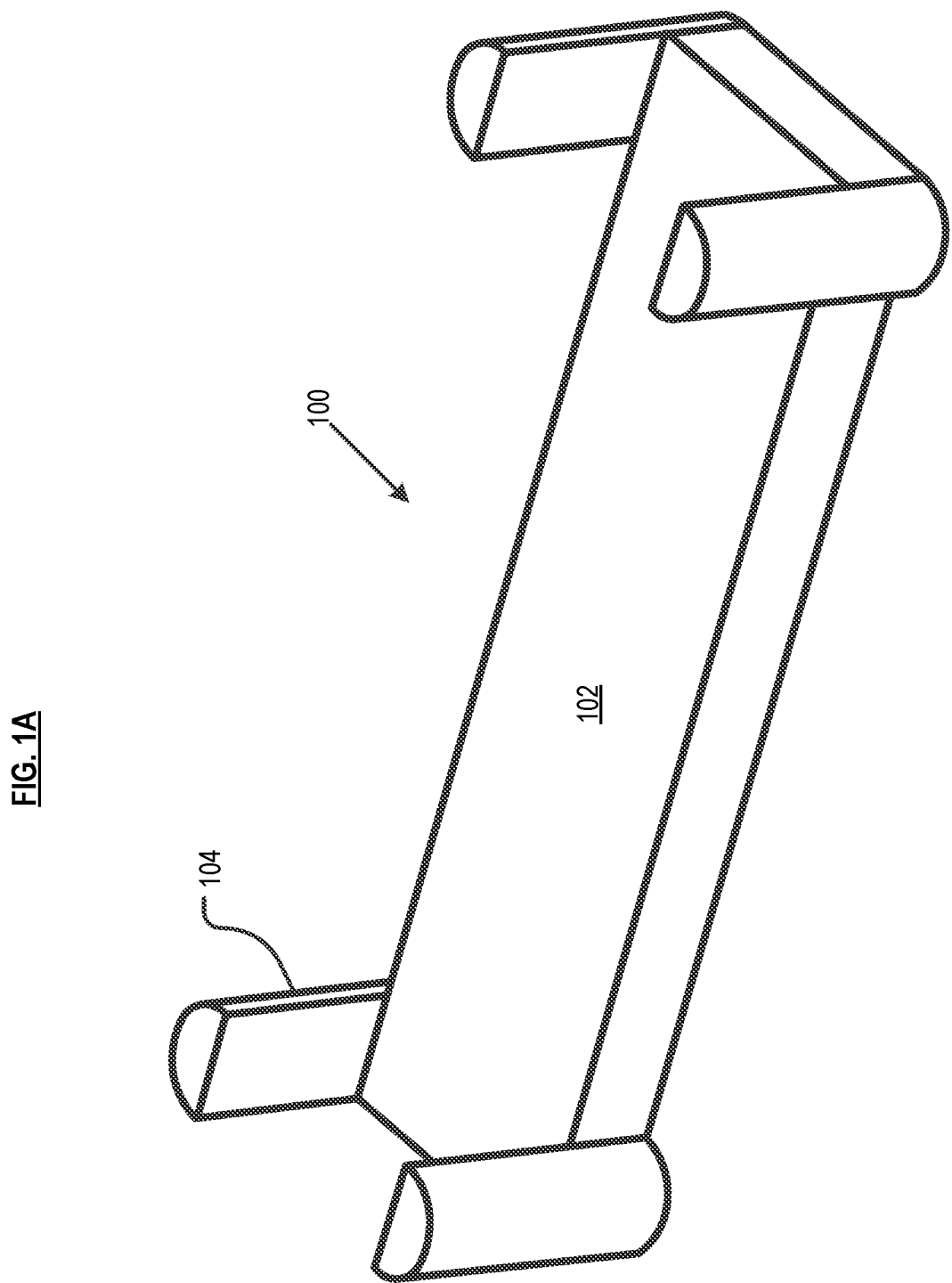

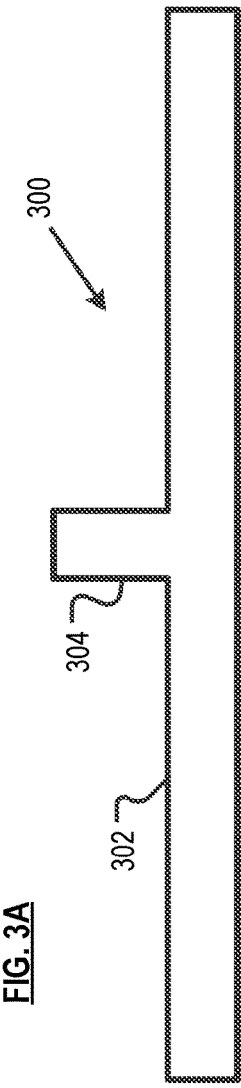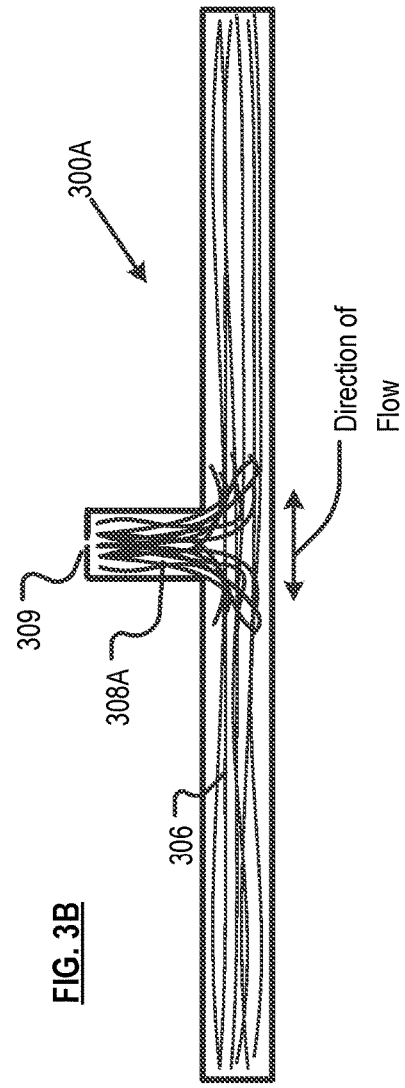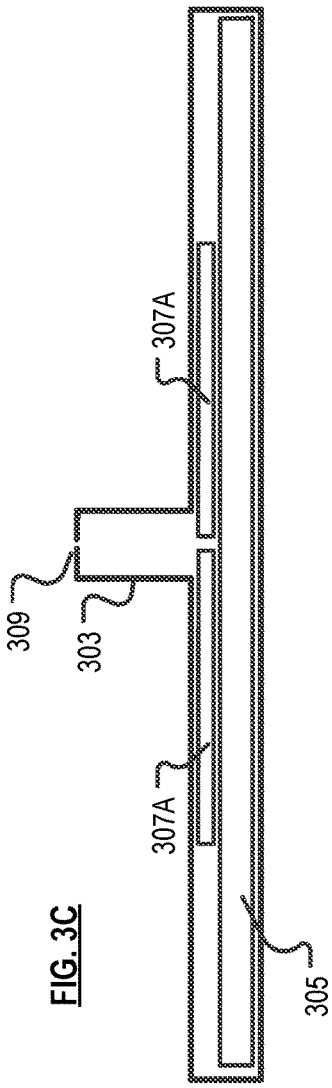

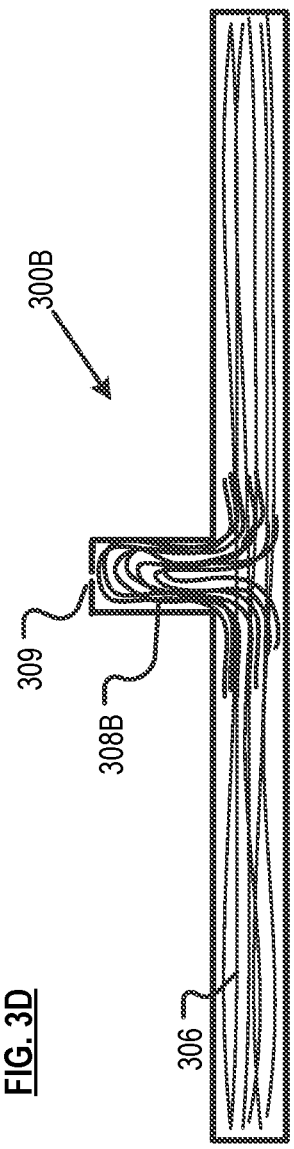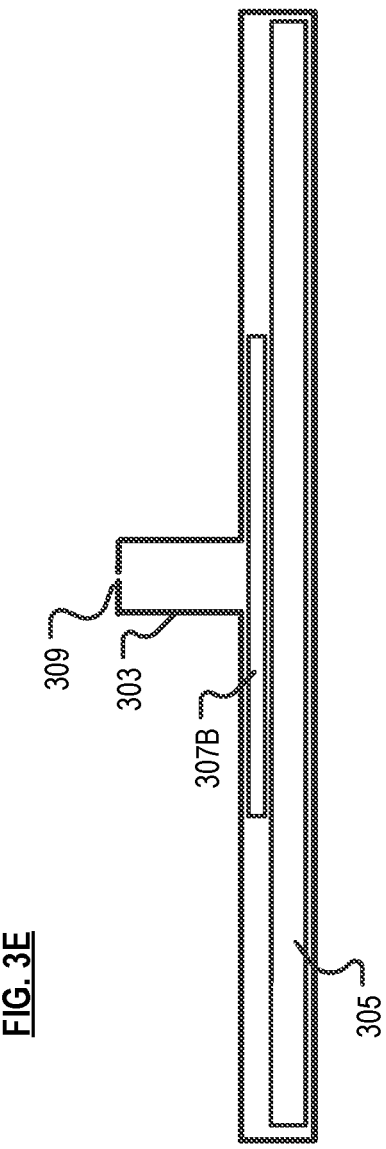

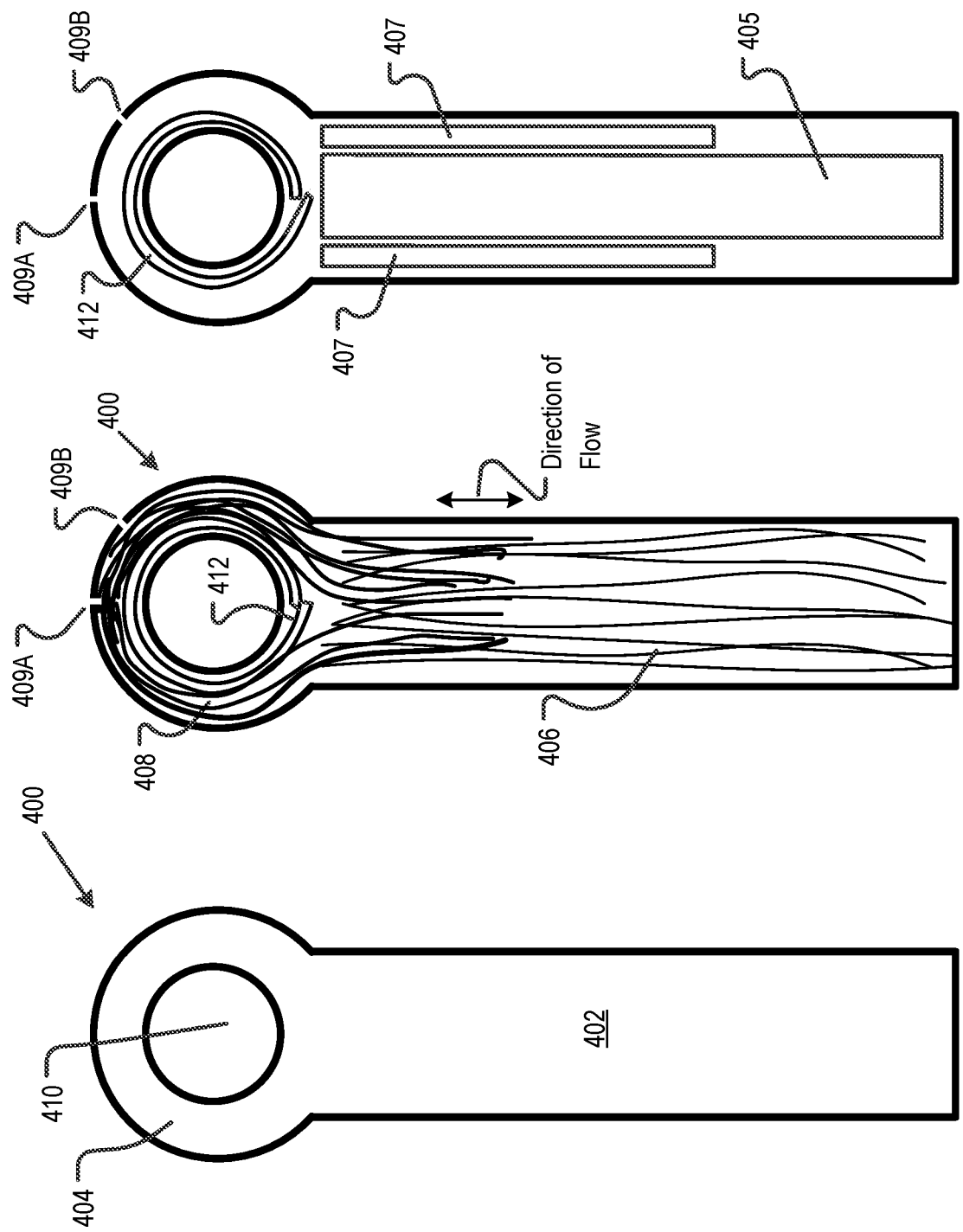

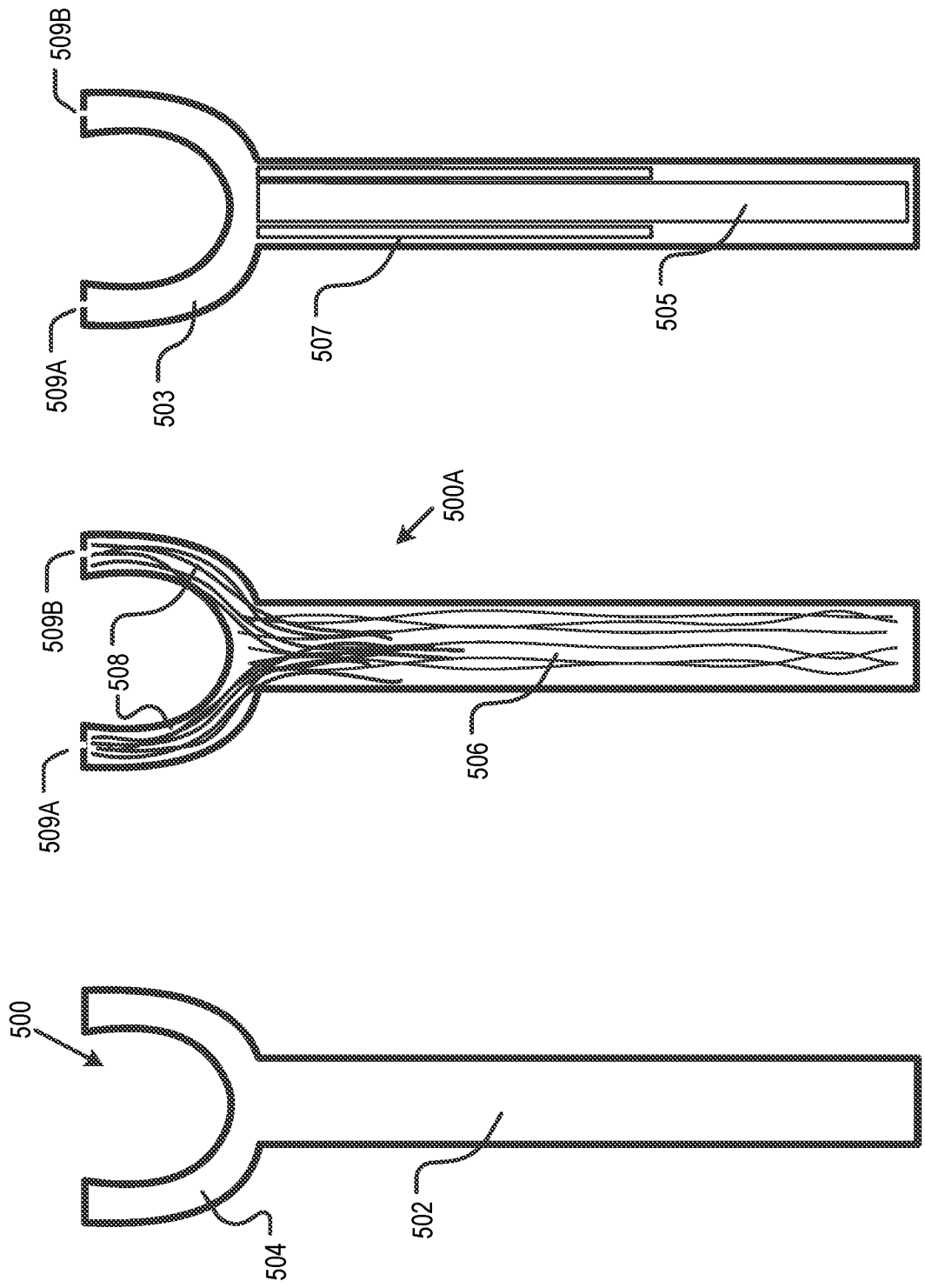

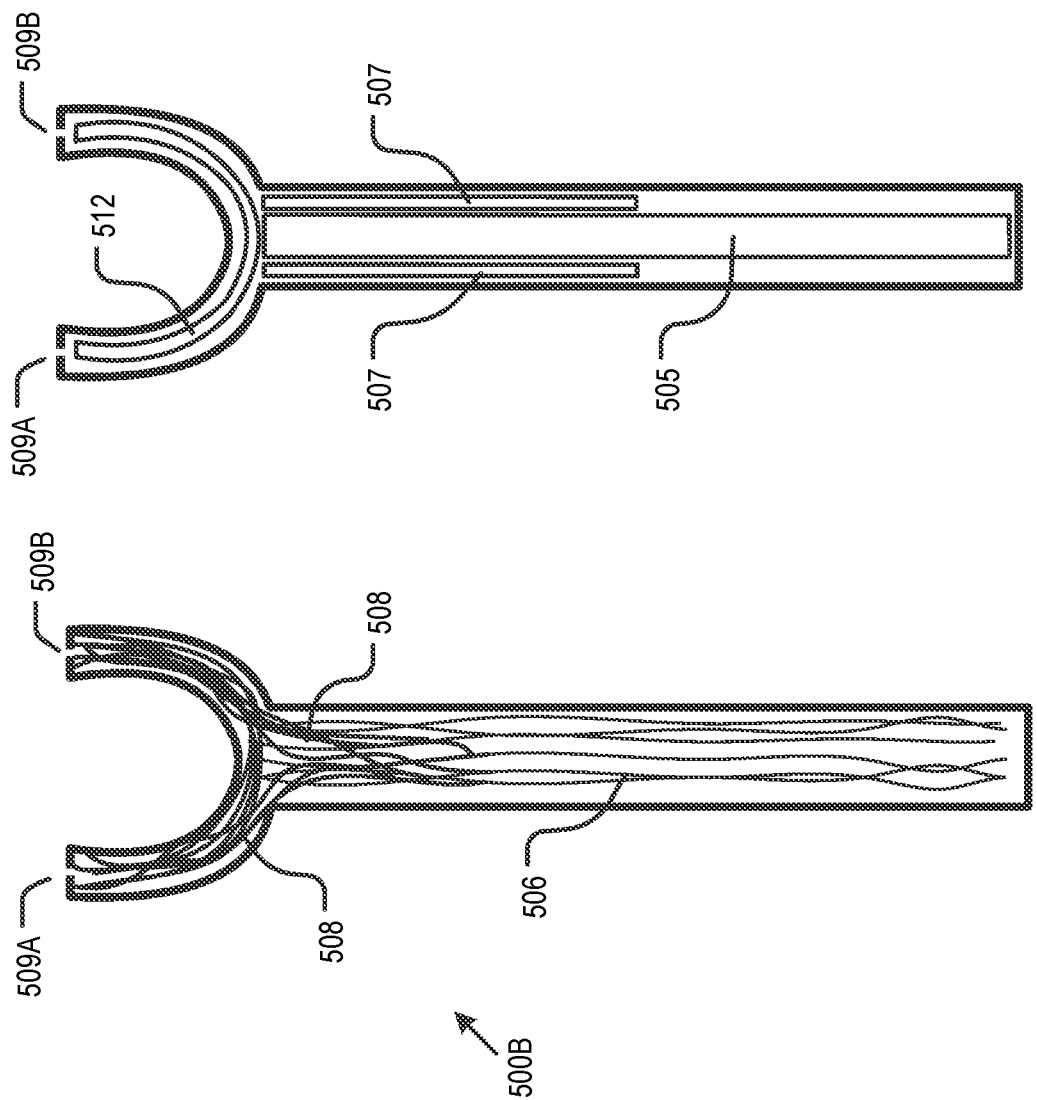

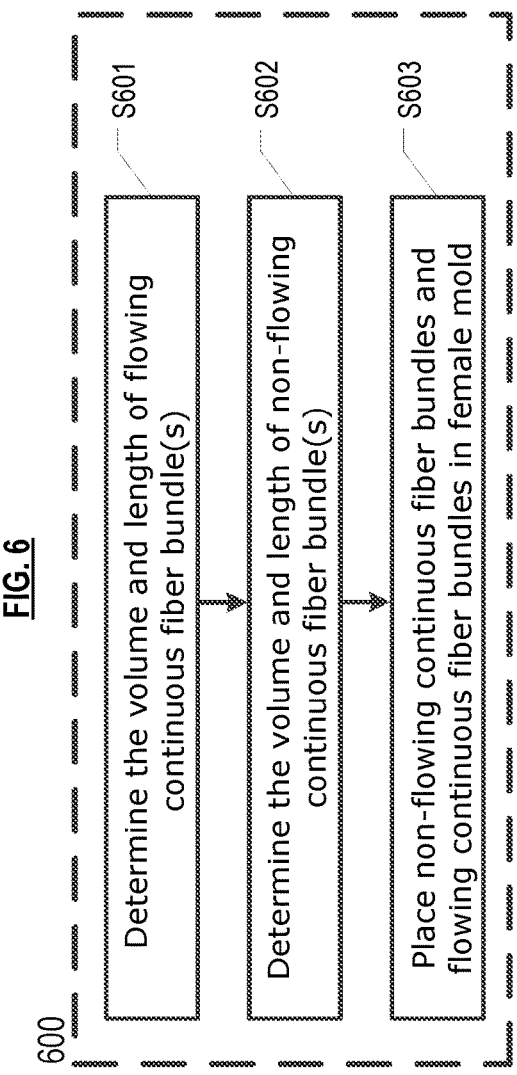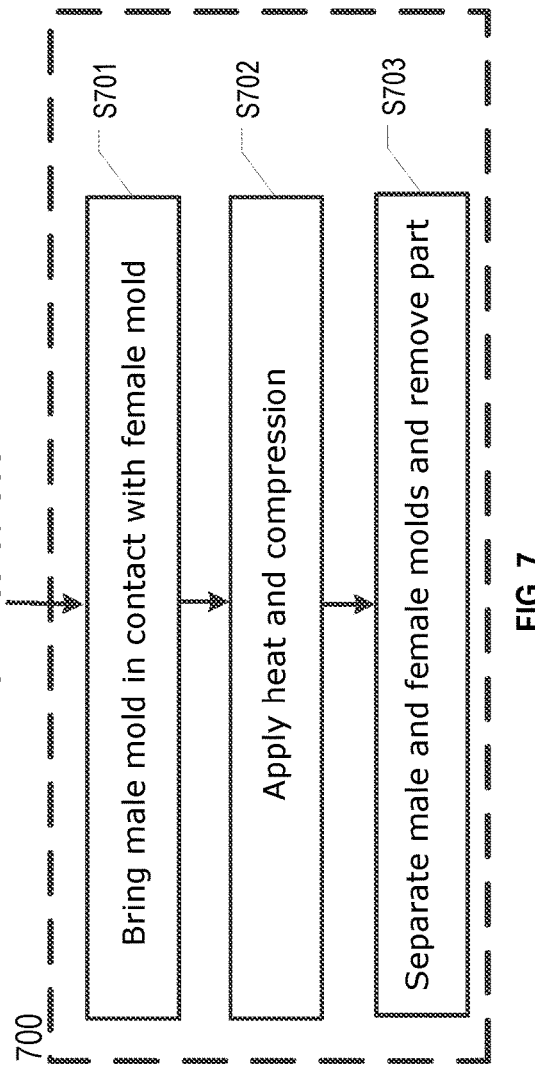

METHODS AND COMPOSITIONS FOR COMPRESSION MOLDING

STATEMENT OF RELATED CASES

This disclosure claims priority to U.S. Pat. App. Ser. No. 62/697,070, filed Jul. 12, 2018 and which is incorporated herein by reference.

FIELD OF THE INVENTION

The present invention relates to compression molding.

BACKGROUND OF THE INVENTION

There are various methods for fabricating a part using composite materials, such as fiber-reinforced plastics. One such method is compression molding. In compression molding, a raw material(s) is placed in a mold, and then heated and compressed.

In the case of fiber-reinforced composite materials, fiber and resin (or fiber pre-preg) is placed in a mold. Depending on the geometry of the part being formed, and the stresses to which it is subjected during use, either chopped, randomly oriented, or continuous fiber that is pre-formed to the mold may be used. The mold remains closed for a period of time and goes through a heating and cooling cycle based on the resin used. This ensures that the resin has time to flow through the mold, thus filling any voids. During this time, the resin hardens to produce a solid molded-plastic part.

The use of fiber-reinforced composites in compression molding presents certain challenges. For example, the presence of voids compromises the strength of a part. Voids can occur, for example, if the resin does not achieve an acceptably low viscosity before it begins to harden. Moreover, it can be problematic to flow resin to portions of the mold having very small features, or features that are out-of-plane with respect to the bulk of the part. Additionally, although the resin matrix plays an important role in the integrity of the part, enhanced strength is due primarily to the presence of fibers. Consequently, even if a finished part includes minimal voids, if the fibers are not appropriately distributed, the strength of the part can be compromised.

SUMMARY OF THE INVENTION

The present invention provides a method and composition for use in compression molding that avoids some of the drawbacks of the prior art. Methods and compositions in accordance with the present teachings utilize "non-flowing continuous" fibers and "flowing continuous" fibers. In some embodiments, a method for "laying-up" fiber bundles is provided. In some other embodiments, a layup comprising fiber bundles is provided. In some embodiments, the method and composition are used to provide improved fiber-reinforced composite parts via compression molding. The methods and compositions disclosed herein are particularly useful for forming parts that includes off-axis, out-of-plane, or small, intricate features.

During the course of molding beams having relatively small (compared to the beam) cavities at either end, the inventors discovered that fiber bundles that are about the same length as the beam did not flow into the cavities, although the resin did. In fact, these relatively long continuous fiber bundles tend not to flow at all. The inventors found, however, that when relatively shorter-length fiber bundles were added to the mold along with the longer fiber bundles, the relatively shorter fibers preferentially flowed into and filled the cavities. Although these shorter fiber bundles were "non-continuous" with respect to the major feature—the beam—they were "continuous" with respect to the minor feature—the cavities. That is, the shorter fiber bundles were slightly longer than the cavities.

These shorter fibers/fiber bundles, which are continuous with respect to one or more minor features of a mold (but not with respect to a major feature of the mold) are referred to herein and the appended claims as "flowing continuous" fibers or fiber bundles, for the reason noted. The relatively longer fiber bundles, which extend the length of a major feature of the mold and will not "flow" in a compression-molding process, are referred to herein and the appended claims as "non-flowing, continuous" fiber or fiber bundles. It is notable and important that flowing, continuous fiber, as that term is used herein, is not the same as "chopped fiber." Typically, although not necessarily, chopped fiber is shorter in length than the flowing continuous fibers, as a function of size of the minor feature. Moreover, chopped fiber assumes a random orientation in the mold (and in the molded part), whereas in embodiments of the invention, the flowing fiber is specifically aligned for maximum strength and stiffness.

It was found that, as long as the flowing, continuous fibers are of sufficient length to extend beyond the confines of the cavity that they are filling, such flowing fibers entwine themselves with the non-flowing continuous fiber via overlap and, of course, the resin matrix itself. The flowing, continuous fibers tend to align with the direction of resin flow, which increases the strength and stiffness of small features.

The inventors recognized that the strategic placement of "vents," typically at a remote end of a minor feature, promotes flow of fibers into the minor feature. More particularly, the vents help in establishing and maintaining a relatively lower pressure region in the minor feature(s) relative to the major feature(s). This pressure differential promotes flow of resin, and appropriate-length fibers (i.e., the flowing continuous fiber) with it.

In some embodiments, a method in accordance with the present teachings comprises:

disposing at least one non-flowing continuous fiber bundle in the female mold, wherein the at least one non-flowing continuous fiber bundle has a first length and aligns with the long axis; and disposing at least one flowing continuous fiber bundle in the female mold proximal to the at least one minor feature, wherein the at least one flowing continuous fiber bundle has a second length that is less than 50 percent of the first length.

In some other embodiments, a method in accordance with the present teachings comprises:

disposing at least one non-flowing continuous fiber bundle in the female mold, wherein the at least one non-flowing continuous fiber bundle aligns with the long axis; and disposing at least one flowing continuous fiber bundle in the female mold proximal to the at least one minor feature, wherein the at least one flowing continuous fiber bundle aligns with the long axis of the major feature.

In yet some additional embodiments, a method in accordance with the present teachings comprises:

disposing a bundle of first fibers in the major feature of the female mold, wherein the first fibers have a length that is substantially equal to a length of the one major feature along the long axis thereof; and disposing a bundle of second fibers in female mold proximal to the at least one minor feature and aligned with the long axis of the major feature, wherein the second fibers have a length that is at least 10 percent greater than a length of the at least one minor feature.

In still further embodiments, a method in accordance with the present teachings comprises:

disposing a bundle of first fibers in the major feature of the female mold, wherein the first fibers have a length that is substantially equal to a length of the one major feature along the long axis thereof; and disposing a bundle of second fibers in the female mold proximal to the at least one minor feature, wherein the bundle of second fibers are aligned with the expected direction of flow of resin into the at least one minor feature.

In some further embodiments, compositions comprising layups for compression molding as described in the methods are provided. Specifically, in some embodiments, a lay-up for compression molding utilizing a female mold, the female mold including a least one major feature having a long axis, and at least one minor feature, the layup comprising:

at least one non-flowing continuous fiber bundle in the female mold, wherein the at least one non-flowing continuous fiber bundle has a first length and aligns with the long axis; and at least one flowing continuous fiber bundle in the female mold proximal to the at least one minor feature, wherein the at least one flowing continuous fiber bundle has a second length that is less than 50 percent of the first length.

In some other embodiments, a lay-up for compression molding utilizing a female mold, the female mold including a least one major feature having a long axis, and at least one minor feature, the layup comprising:

at least one non-flowing continuous fiber bundle in the female mold, wherein the at least one non-flowing continuous fiber bundle aligns with the long axis; and at least one flowing continuous fiber bundle in the female mold proximal to the at least one minor feature, wherein the at least one flowing continuous fiber bundle aligns with the long axis of the major feature.

In yet some additional embodiments, a lay-up for compression molding utilizing a female mold, the female mold including a least one major feature having a long axis, and at least one minor feature, the layup comprising:

a bundle of first fibers in the major feature of the female mold, wherein the first fibers have a length that is substantially equal to a length of the one major feature along the long axis thereof; and disposing a bundle of second fibers in female mold proximal to the at least one minor feature and aligned with the long axis of the major feature, wherein the second fibers have a length that is at least 10 percent greater than a length of the at least one minor feature.

In still further embodiments, a lay-up for compression molding utilizing a female mold, the female mold including a least one major feature having a long axis, and at least one minor feature, the layup comprising:

a bundle of first fibers in the major feature of the female mold, wherein the first fibers have a length that is substantially equal to a length of the one major feature along the long axis thereof; and disposing a bundle of second fibers in the female mold proximal to the at least one minor feature, wherein the bundle of second fibers are aligned with the expected direction of flow of resin into the at least one minor feature.

And yet in some further embodiments, the methods and compositions are used to form fiber-composite parts via a compression molding process.

Summarizing, the invention, as depicted and described, comprises the use of non-flowing continuous fiber bundle(s) and flowing continuous fiber bundle(s) in methods and compositions for compression molding. Various embodiments of invention may further comprise at least one of the following features, in any (non-conflicting) combination, among other features disclosed herein:

The flowing continuous fibers/bundles are less than half the length of the non-flowing continuous fibers/bundles;

In the layup, the flowing continuous fiber bundle(s) are aligned with the long axis of a major feature of the mold;

In the layup, the flowing continuous fiber bundle(s) are sited proximal to the minor feature they are intended to fill;

The non-flowing continuous fibers/bundles have a length that is substantially equal to the length of a major feature of the mold;

The flowing continuous fibers/bundles have a length that is at least 10 percent greater than that of the minor feature that they are intended to fill;

In the layup, the flowing continuous fiber bundle(s) are aligned with the expected direction of flow of resin into the minor feature they are intended to fill.

In the layup, a preform is sited in one or more minor features to improve the ability of the that feature to withstand anticipated stresses.

The flowing continuous fibers that flow in the minor feature flow out-of-plane with respect to the major feature of the mold.

One or both of the fibers and resin in the non-flowing continuous fiber bundle is different than the fibers and resin in the flowing continuous fiber bundle, although the resins must be compatible with one another.

In parts formed from the method, the portion of the fibers extending beyond the minor feature substantially align with the long axis of the major feature.

The flowing continuous fibers bundles and non-flowing continuous fiber bundles have an aspect ratio of width to thickness (cross-section) that is the range of about 0.25 to about 6.

The flowing continuous fibers are flowed into a minor feature.

Chopped fiber is not used in the layup.

Tape is not used in the layup.

Minor features of a mold are vented to promote flow of fibers therein.

BRIEF DESCRIPTION OF THE DRAWINGS

FIG. 1A depicts a first molded part.

FIG. 3A depicts a third molded part.

FIG. 3B depicts the third molded part of FIG. 3A, and illustrates, for a first embodiment thereof, a final arrangement of fiber in the finished part.

FIG. 3C depicts a layup of fiber bundles for achieving the final arrangement of fiber shown in FIG. 3B.

FIG. 3D depicts the third molded part of FIG. 3A, and illustrates, for a second embodiment thereof, a final arrangement of fiber in the finished part.

FIG. 3E depicts a layup of fiber bundles for achieving the final arrangement of fiber shown in FIG. 3D.

FIG. 4A depicts a fourth molded part.

FIG. 4B depicts the fourth molded part of FIG. 4A, and illustrates, for a first embodiment thereof, a final arrangement of fiber in the finished part.

FIG. 4C depicts a layup of fiber bundles for achieving the final arrangement of fiber shown in FIG. 4B.

FIG. 5A depicts a fifth molded part.

FIG. 5B depicts the fifth molded part of FIG. 5A, and illustrates, for a first embodiment thereof, a final arrangement of fiber in the finished part.

FIG. 5C depicts a layup of fiber bundles for achieving the final arrangement of fiber shown in FIG. 5B.

FIG. 5D depicts the fifth molded part of FIG. 5A, and illustrates, for a second embodiment thereof, a final arrangement of fiber in the finished part.

FIG. 5E depicts a layup of fiber bundles for achieving the final arrangement of fiber shown in FIG. 5D.

FIG. 6 depicts a block flow diagram of a first method in accordance with an embodiment of the invention.

FIG. 7 depicts a block flow diagram of a second method in accordance with an embodiment of the invention.

DETAILED DESCRIPTION

Figure 1B:
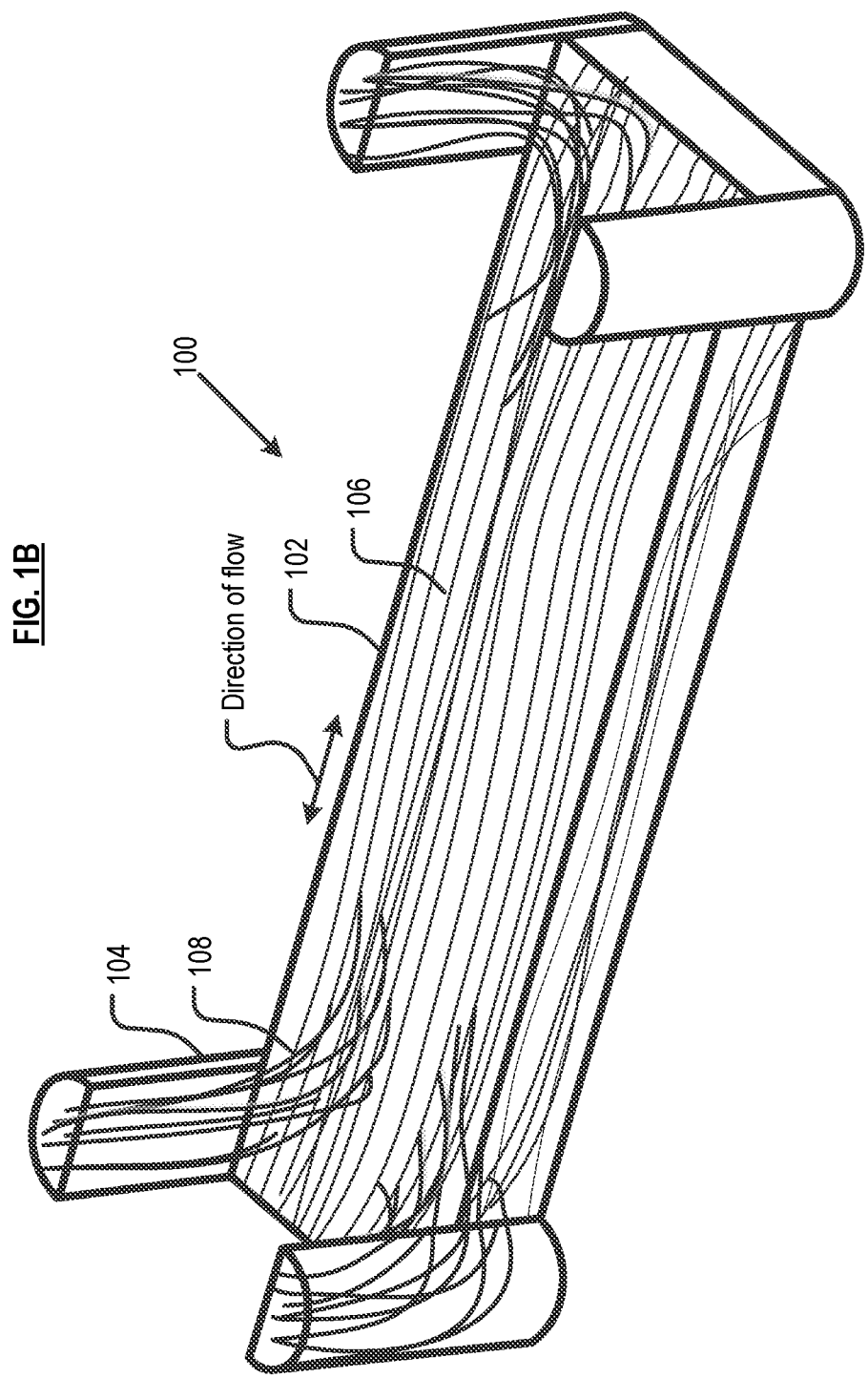
FIG. 1B depicts the first molded part of FIG. 1A, and illustrates, for a first embodiment thereof, a final arrangement of fiber in the finished part.

Compression molding, well known in the art, utilizes a female mold and a male mold, applying heat and pressure to form a molded part. Relative to the prior art, methods described herein provide improvements in compression-molded parts comprising fiber composites.

Referring now to FIG. 6, in method 600 in accordance with the invention, the volume and length of the flowing continuous fiber bundle(s) are determined in task S601. The length of a flowing continuous fiber bundle(s) is based on the length of the typically relatively smaller cavities/feature(s) (hereinafter "minor features") that depend from the major features(s), plus the amount of overlap that is desired between the flowing fiber and the non-flowing fiber. In other words, the "overlap" is a measure of how far the flowing fibers will extend beyond the minor feature. The desired overlap is based, at least in part, on the type/location of stresses to which the final fiber-composite part will be subjected. As a practical minimum, the flowing continuous fiber should overlap the non-flowing continuous fiber by at least ten percent of the length of the flowing fiber. Thus, by way of example, if the flowing continuous fiber has a length of 7 millimeters, it should overlap the non-flowing fibers by at least 0.7 mm. More preferably, flowing fibers should overlap non-flowing by 20 percent or more of the length of the flowing fibers. With respect to a maximum overlap, as the length of the flowing continuous fiber increases, it will reach a length at which it does not flow; that is, it is non-flowing continuous fiber. That length, and the corresponding amount of overlap, is determined via simple experimentation.

As implied by the foregoing, the volume of the flowing continuous fiber bundles will be greater than the volume of the features they are intended to form, because the flowing continuous fibers will extend beyond the features that they form.

In operation 602, the volume and length of the non-flowing continuous fiber bundles are determined. This can be done in several ways, one of which is (i) determining the volume of the major feature or features of the part to be fabricated, and (ii) subtracting, from the major feature volume, the "overlap" volume, which is the volume of flowing continuous fibers that extend beyond the minor feature(s). Another way to perform this determination is to subtract the volume of the flowing fibers from the total volume of the part.

A major feature is the largest feature, or one of several features that are about the same size and that dominate, in terms of size, any other features of a mold. The major feature will typically have a maximum dimension, which is referred to herein as its length, which will determine the length of the non-flowing continuous fiber bundle(s) for that major feature. That is, the length of the non-flowing continuous fiber bundle(s) is substantially equal to the largest dimension of the major feature. If there is more than one major feature, and the major features have different lengths, then the non-flowing continuous fiber bundle(s) associated with the different major features will have different lengths. The volume of a major feature is determined in the usual fashion (e.g., length×width×height for rectangular-shaped features, cross sectional area×length for cylindrical/semi cylindrical features, etc.).

After the volume of the major feature is determined, the overlap volume is subtracted therefrom, providing the minimum required volume of the non-flowing continuous fiber bundle plus the resin (or the non-flowing continuous fiber prepreg).

The major feature(s) will often be significantly larger than the minor features of the mold. Consequently, the flowing continuous fiber bundle(s) in mold will typically be shorter than the non-flowing continuous fiber bundle(s). For the majority of parts, the length of the flowing continuous fibers/bundle(s) will be less than 50 percent of the length of non-flowing continuous fibers/bundle(s).

Per operation S603, the fiber bundles are placed in the female mold. Preferably, the flowable continuous fiber bundle(s) is placed proximal to the minor features.

Based on the layup provided by method 600, a fiber-composite part can be formed, per method 700 (FIG. 7). In accordance with operation S701, the male mold is brought into contact with the female mold, which contains a lay-up in accordance with the invention, as provided by method 600. The molding materials (i.e., the fiber and resin or fiber prepreg) are then subjected to elevated temperatures and pressures in operation S702. As the resin reaches its melt temperature, the pressure causes the flowing fiber bundles to move towards regions of lower pressure. Such lower pressure regions will be the minor features; that is, open cavities, vented cavities, or sections of the mold that have a smaller volume percentage of molding material than adjacent mold sections. The process is continued for a period of time and goes through a heating and cooling cycle based on the resin being used. In operation S703, the two mold halves are separated and the final part is removed, such as via ejector pins or other known techniques.

The interplay between these three factors (i.e., pressure, heat, and time), the alignment of molding material (with respect to the cavities, etc.), the position and size of vents, and the use of flowable continuous fiber bundles are the primary variables that can be used to control the flow and alignment of fibers to achieve the functional requirements of the fabricated part.

In accordance with the present teachings, during layup, non-flowing continuous fiber bundles are aligned with the long axis of the major feature they are intended to occupy. In some embodiments, flowing continuous fiber bundles are also aligned with the long axis of a major feature, and sited proximal to the minor feature that the fibers are intended to occupy. In some embodiments, however, the flowing continuous fiber bundles are aligned with the expected direction of flow (of resin) into the minor feature, to the extent that differs from the long axis of the major feature. The expected direction of flow can be determined by CFD (computational fluid dynamics).

The fibers suitable for use herein are typically in the form of resin-impregnated bundles ("pre-preg"), which typically include thousands of individual fibers, in the form of "towpreg." As used herein, the term "fiber bundle" means an amount of fibers in the range of 5 to about 80,000 fibers. The fiber bundles are typically more or less cylindrical arrangements (i.e., cylindrical tows). However, in some alternative embodiments, rectangular, ovular, flat tows, or tape can be used. Fiber bundles are distinguishable from tape based on the aspect ratio of width to thickness (i.e., cross section). Tape will typically have a ratio of width to thickness in the range of 100 to 1000, whereas the fiber bundles used in conjunction with some embodiments of the invention will have a ratio of width to thickness in the range of 0.25 to 6. The fiber bundles are usually circular, but oval form factors are not atypical.

Fibers suitable for use in conjunction with the invention include any type of fiber that can withstand the operating temperatures of a compression molding process (as a function of resin selection). For example, and without limitation, suitable fiber include: carbon, glass (A, C, E, S, D types), aramid, ceramic, natural, metal, cellulose, among others. The fibers within the towpreg can have any diameter, which is typically but not necessarily in a range of 1 to 100 microns. The cross-sectional shape of the fiber can be circular, oval, trilobal, polygonal, etc. The fiber can have a solid core or a hollow core. The fiber can be formed of a single material, multiple materials, and can itself be a composite. The fiber can include an exterior coating such as, without limitation, sizing, to facilitate processing. In some embodiments, multiple types of fiber can be used to produce a single part.

As previously mentioned, in some embodiments, prepreg, which is fiber that is pre-impregnated with resin, is used in conjunction with the invention. However, in some other embodiments, fiber and resin are delivered separately to the mold or as a comingled yarn. Any resin system that flows when subjected to heat and pressure is suitable for use in conjunction with embodiments of the invention. More preferably, embodiments of the invention use a thermoplastic resin, such as, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyamide (PA), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC), etc.

The minor features formed using the present method can be exceedingly small. Wall thicknesses as small as 0.1 millimeters and having a length-to-thickness ratio of over 40:1 have been demonstrated. The minor features can have any shape. In some embodiments, the minor features will require the flowed fibers to bend in excess of 90 degrees.

FIG. 1A depicts part 100, molded in accordance with the present method. Part 100 includes beam 102 and legs 104. The beam is a "major feature" and each leg is a "minor feature." FIG. 1B depicts the orientation of fibers in part 100. Non-flowing continuous fibers 106 span the length of beam 102. Flowing continuous fibers 108 extend fully into legs 104 and out some distance into beam 102. Although both fibers 106 and 108 appear to be on the surface of part 100, it will be understood by those skilled in the art that the fibers depicted in this figure, and the many more that are not depicted, are distributed through the thickness of the beam 102 and legs 104.

The ends of flowed continuous fiber 108 that intermingle with non-flowed continuous fiber 106 aligns with the direction of flow (i.e., aligned with the long axis of the beam). Fibers 108 are omitted from one of the legs for clarity.

Figure 1C:
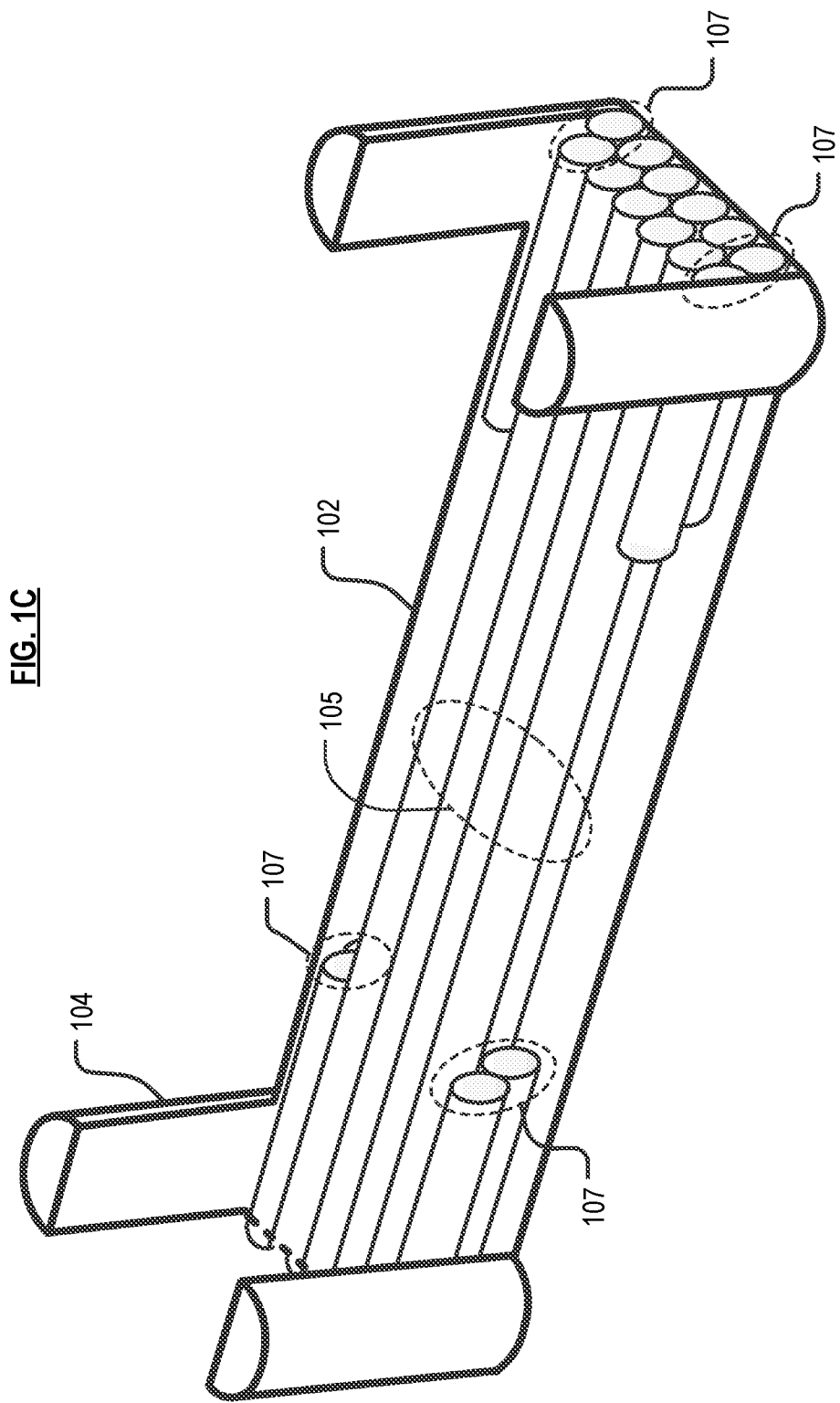
FIG. 1C depicts a layup of fiber bundles for achieving the final arrangement of fiber shown in FIG. 1B.

FIG. 1C depicts the layup of the fiber bundles. Of course, the fiber bundles are placed in the female mold; for pedagogical purposes, they are superimposed on the finished part (as for FIG. 2C). Fiber bundles include eight fiber bundles 105 of non-flowing, continuous, unidirectional fiber for strength and stiffness in bending, and eight fiber bundles 107 of flowing continuous fiber. To the extent possible, fiber bundles 107 are sited proximal to the features they are intended to fill.

Figure 2A:
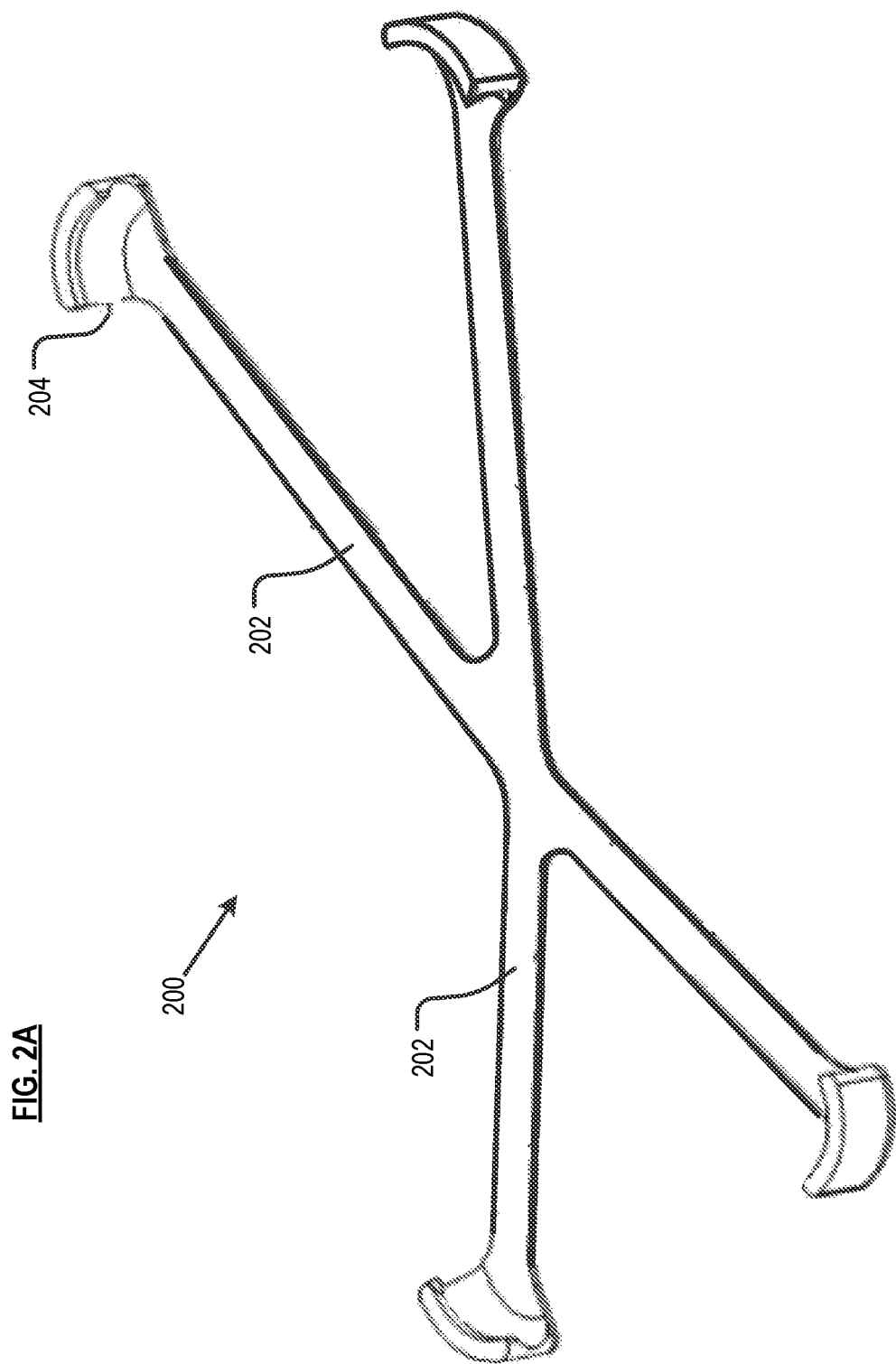
FIG. 2A depicts a second molded part.
Figure 2B:
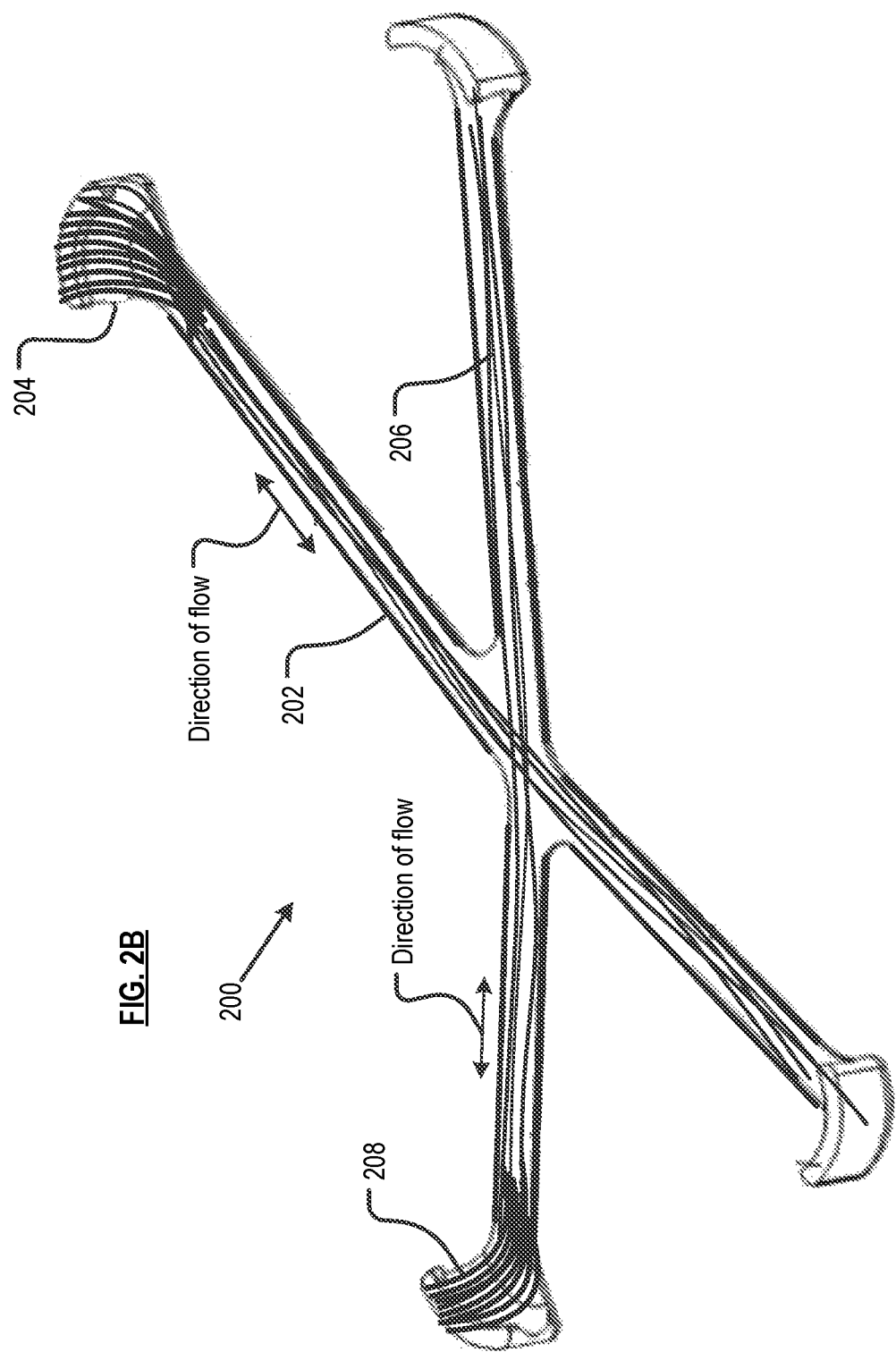
FIG. 2B depicts the second molded part of FIG. 2A, and illustrates, for a first embodiment thereof, a final arrangement of fiber in the finished part.

FIG. 2A depicts part 200 having an "x" shape. Part 200 consists of two long beams 202 and four cupped receivers 204 at each end of the two beams. Long beams 202 are "major features" and the cupped receivers 204 are "minor features." FIG. 2B depicts the orientation of fibers in part 200 (fibers are omitted from two of the receivers for clarity). Non-flowing continuous fibers 206 span the length of beam 202. Flowing continuous fibers 208 extend fully into receivers 204 and out some distance into associated beam.

Thus, flowing continuous fibers 208 flow axially along each base beam 202, and fan outward to fill the widening geometry of each receiver 204. The fibers flow upward and beyond 90 degrees as they conform to the female mold. It is notable the thickness of receivers 204 vary from thick, to thin, and then returning to thick. The flowing fibers in receivers 204 are substantially aligned with the axial direction of the beams, providing bending strength to curved receivers 204.

Figure 2C:
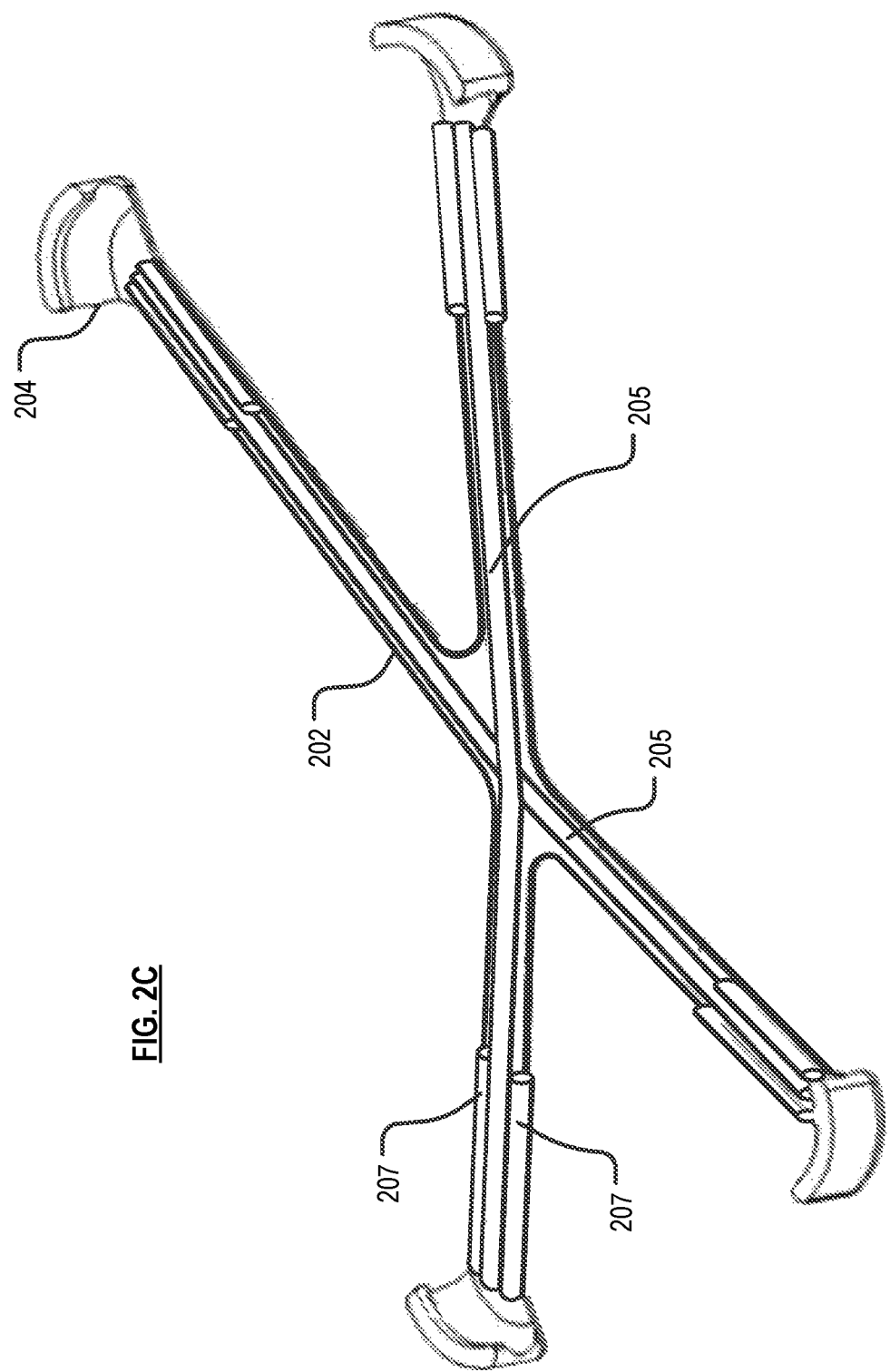
FIG. 2C depicts a layup of fiber bundles for achieving the final arrangement of fiber shown in FIG. 2B.

FIG. 2C depicts the layup of the fiber bundles. Fiber bundles include two long fiber bundles 205 of non-flowing, continuous, unidirectional fiber. In the illustrative embodiment, one of the fiber bundles 205 overlaps the other. In some other embodiments (not depicted), fiber bundles 205 could be bent. One end of such bent fiber bundles could be disposed near the end of either beam and bend around the center of the "x" to terminate at any other beam end. Additionally, part 200 is made using eight fiber bundles 207 of flowing continuous fiber. Once again, fiber bundles 207 are proximal to the features they are intended to fill.

FIG. 3A depicts part 300 comprising beam 302 and boss 304; the former is the major feature and the latter is the minor feature. FIG. 3B depicts first embodiment 300A of part 300. Non-flowing continuous fibers 306 span the length of beam 302. Flowing continuous fibers 308A extend fully into boss 304 and out some distance into beam 302.

FIG. 3C depicts the layup of the fiber bundles for the embodiment depicted in FIG. 3B. The fiber bundles include fiber bundle 305 of non-flowing, continuous, unidirectional fiber for strength and stiffness in bending, and two fiber bundles 307A of flowing continuous fiber. Fiber bundles 307A are sited near to cavity 303 that will create boss 304. As depicted in FIG. 3B, for this embodiment, fibers in fiber bundles 307A enter the cavity "head first," creating embodiment 300A of part 300.

FIG. 3D depicts second embodiment 300B of part 300. Non-flowing continuous fibers 306 span the length of beam 302. Flowing continuous fibers 308B extend fully into boss 304 and out some distance into beam 302. However, unlike embodiment 300A, each flowing fiber 308B flows from the center of the fiber into cavity 303. This fiber arrangement will imbue embodiment 300B with a greater ability to withstand compressive stress or axial impact stress on boss 304 than the fiber arrangement of embodiment 300A. FIG. 3E depicts the layup of fiber bundles for the embodiment depicted in FIG. 3D. The two bundles 307A of flowing fiber are replaced by a single, longer fiber bundle 307B.

FIG. 4A depicts rod end 400 having eye-shaped head or ring 404 and integral shank 402. Head 404, which is a "minor feature," includes circular opening 410. FIG. 4B depicts the orientation of fibers in part 400. Non-flowing continuous fibers 406 span the length of shank 402. Flowing continuous fibers 408 extend fully and intermingle in head 404 and protrude some distance into the fibers in shank 402. In this particular embodiment, (non-flowing) spiral preform fiber bundle 412 is positioned around opening 410. This imbues the rod end 400 with high hoop strength. As in previous embodiments, the portion of flowing continuous fibers 408 that mingle with non-flowing continuous fibers 408 align with the direction of flow along shank 402.

FIG. 4C depicts the layup of the fiber bundles to produce the embodiment depicted in FIG. 3B. The fiber bundles include fiber bundle 405 of non-flowing, continuous, unidirectional fiber for strength and stiffness in bending, fiber bundles 407 of flowing continuous fiber, and spiral preform 412. In accordance with the illustrative method, fiber bundles 407 are sited proximal to cavity 403 that will create head 404.

FIG. 5A depicts fork 500, including handle ("major feature") 502 and tines ("minor feature") 504. FIG. 5B depicts first embodiment 500A of part 500. In this embodiment, as usual, non-flowing continuous fibers 506 span the length of handle 502. Flowing continuous fibers 508 extend fully into tines 504 and protrude some distance into fibers 506 in handle 502.

FIG. 5C depicts the layup of the fiber bundles to produce the embodiment depicted in FIG. 5B. The fiber bundles include fiber bundle 505 of non-flowing, continuous, unidirectional fiber for strength and stiffness in bending, and two fiber bundles 507 of flowing continuous fiber. In accordance with the illustrative method, fiber bundles 507 is sited near to the cavity 503 that will create tines 504.

FIG. 5D depicts second embodiment 500B of fork 500. Once again, non-flowing continuous fibers 506 span the length of handle 502. Flowing continuous fibers 508 extend fully into tines 504 and out some distance into non-flowing fibers 506 in the handle. As best seen in FIG. 5E, embodiment 500B includes u-shaped fiber preform 512, in addition to non-flowing continuous fiber bundle 505 and flowing continuous fiber bundles 507. Compared to embodiment 500A, embodiment 500B of fork 500, by virtue of fiber preform 512, would be better able to withstand a stress that pulls tines 506 apart.

As previously mentioned, the strategic placement and use of vents in the mold promotes flow of flowing continuous fibers into minor features. The mold for part 100 (FIGS. 1A-1C) is naturally vented because the cavities that form the minor features are open until the last moment when they shut off at the end of the legs. The same is true for the mold for part 200 (FIGS. 2A-2C). For both of molds, the entire end face of the minor features (i.e., legs 104 and cupped receivers 204) are vented until the very end.

For the mold for part 300 (FIGS. 3A-3E), vent 309 is situated at the end of the minor feature (i.e., boss 304). The mold for part 400 (FIGS. 4A-4C) is vented, via vent 409A, at the "top" of ring 404. As desired, the region at which flowing continuous fibers 408 from the bundles 407 entangle one another can be controlled based on where on the ring the vent appears. Offsetting the location of a vent, such as vent 409B, creates uneven flow of fiber around the ring. This will affect the primary location at which the fibers from the two bundles 407 entangle one another. Relative to other locations around the ring, the point of entanglement will be somewhat weaker. Consequently, if enhanced tensile strength is required in a particular region, such as the top of the ring, the point of entanglement is advantageously shifted away from that location. For the mold for part 500 (FIGS. 5A-5E), a vent (vents 509A and 509B) are situated at the end of each tine 504.

There is an amount of natural venting provided by the small gap between mold halves. However, to ensure that a minor feature is filled with resin and fiber, vents are typically used in accordance with the present teachings. The vents are typically small holes, such as in the range of about of 0.05 mm to about 0.5 mm. The vents are kept relatively small to prevent excessive materials loss and to prevent fiber from entering the vents. In some embodiments, multiple vents are used. Vents self-clear on each cycle because the resin in them re-melts and flows from the vent.

In light of the present disclosure, those skilled in the art will understand how to increase the ability of a part to withstand stresses at specific regions thereof by overlapping flowing and non-flowing continuous fibers and additionally, in some embodiments, using a preform having a particularly geometry. Directionally, increasing the overlap between flowing and non-flowing continuous fibers will increase the ability of a part to withstand stress.

Example: Part 100

Part 100 (depicted in FIG. 1A) was molded, via compression molding, and load tested. Several samples of part 100 were formed in accordance with the invention (samples 1-3) and several samples of the part were formed in accordance with the prior art. The results are reported in Table 1, below.

For the examples (i.e., samples 1-3), the part was formed from sized tow-preg (bundles of pre-impregnated fiber). Such sized bundles are referred to as "preforms." Each preform contained 24,000 carbon fibers (Plasitcomp, Inc., Minn.) impregnated with PA (polyamide) 6. For the comparative examples (i.e., Samples 4-6), the part was formed from chopped tow-preg containing the same type of fibers and resin.

The chopped prepreg was not significantly shorter than the preforms of flowing continuous fiber. The difference is in the manner in which the material is laid-up in the mold. Chopped prepreg is randomly oriented throughout the mold, whereas the preforms that provide the non-flowing continuous fiber and those that provide the flowing continuous fiber are placed and oriented in a specific manner, as previously described.

The conditions (i.e., temperature and pressure cycling) are primarily a function of the resin used. Each sample was heated from ambient temperature to 350° F. under 10 psi of pressure. Once at 350° F., the pressure applied to each specimen was increased to 100 psi. While holding 100 psi of pressure, the temperature was increased to 460° F. and held for five minutes. After this holding time, the heat was removed while pressure was maintained, thus cooling the samples until they returned to solid state.

The quantity and size of the preforms required to form the part must be determined. That is accomplished by: (i) determining the volume of the specific regions of the part; (ii) determine what "type" of preform (i.e., non-flowing continuous or flowing continuous) is required for each such specific region; and (iii) calculating the required quantity of each type of preform.

Referring again to FIG. 1A, part 100 includes five different regions: beam 102 and four legs 104. As previously described, beam 102 will be formed from non-flowing continuous fibers, whereas the smaller and off-axis legs 104 will be formed from flowing continuous fibers.

Part Volume.
All dimensions in millimeters (mm or mm³)
Dimensions of beam 102
Length: 25.5
Width: 6.25
Thickness: 1.75
Volume of beam ($V_b$) 102: L×W×T=278.906 mm³
Dimensions of legs 104
Diameter: 2.5
Height: 6.35
Volume of legs ($V_L$) 104: H×[pi·(D/2)²/2]=15.585 mm³
Volume of part ($V_P$) 100: $V_b$+(4×$V_L$)=341.247 mm³
Fiber.
All dimensions in millimeters (mm or mm²)
Diameter of Preform: 1.400
X-sectional area of Preform (Pn): 1.539
Length of Non-flowing continuous fiber ($L_{NFCF}$): 25.5
Length of Flowing continuous fiber ($L_{FCF}$): 10.0
Length of Chopped fiber ($L_{CHF}$): 5.00
Quantity of Non-flowing continuous fiber (NFCF) preforms: $V_b/[L_{NFCF} \cdot P_{xs}]$=8
Quantity of Flowing continuous fiber (FCF) preforms: $V_L/[L_{FCF} \cdot P_{xs}]$=2 (per leg)
Quantity of Chopped fiber (ChF) preforms: $V_P/[L_{ChF} \cdot P_{xs}]$=45
The relatively significant overlap (10.0-6.35=3.65) provided by the (10 mm) length of the flowing continuous fiber was desirable for the anticipated function of the part and the stresses to which the part will be subjected.
The calculated quantity of fiber is rounded-up to next integer. This apparent overfilling of the mold is not undesirable, since there are some losses of material (resin) to flash. Typically, overfilling of a mold by about 3 to about 7% of the mold's overall volume yields adequate quality in a finished part.
Comparative Testing.

TABLE 1

Comparative Testing of Load Strength

| Sample No. | Preform Feed | Weight of Sample <grams> | Maximum Load <Lbf> |
|---|---|---|---|
| 1 | Oriented NFCF/FCF | 0.52 | 136.82 |
| 2 | Oriented NFCF/FCF | 0.50 | 131.01 |
| 3 | Oriented NFCF/FCF | 0.51 | 145.72 |
| 4 | Randomly Oriented ChF | 0.50 | 19.50 |
| 5 | Randomly Oriented ChF | 0.51 | 38.87 |
| 6 | Randomly Oriented ChF | 0.50 | 54.63 |

Table I depicts the results of load testing. The loading-bearing capacity of part 100, when fabricated in accordance with the present teachings, improved by 266% on average relative to its load-bearing capacity when formed using chopped fiber. The maximum load was determined by a universal testing machine built by Instron, setup with compression platens (i.e., for the application of downwardly directed force). The samples were situated in the center of the bottom platen, with the beam on top and legs underneath, thus creating four contact points on the bottom platen. A loading apparatus was affixed to the top platen to load the samples in three-point bending, the two support points supplied by the legs and the third loading point supplied by the loading apparatus on the top platen. The loading apparatus applied force to the minor axis of the top beam surface. Flowed specimens failed in the beam center, whereas chopped specimens failed at the leg-beam joint.

Definitions

"Flowing continuous" fibers or fiber bundles means fibers/bundles having a length that is typically slightly longer than the length of a minor feature of a mold and, when placed in a mold, are typically aligned with the long axis of a major feature of the mold.

"Non-flowing, continuous" fiber or fiber bundles means fibers/bundles having a length that is about equal to the length of a major feature of the mold and will not flow during a compression molding process.

"Chopped" fiber or fiber bundles means fibers/bundles that are smaller than the length of a major feature of the mold and are in a random orientation within the mold (and the final part).

"Preform" is a sized and shaped portion of towpreg/bundle of fibers.

"About" means+/−20% with respect to a stated figure or nominal value.

"Substantially aligned" means a deviation of 20% in any direction from nominal alignment.

"Substantially equal to" means up to 20% above (but not below) a stated figure or nominal value.

It is to be understood that the disclosure describes a few embodiments and that many variations of the invention can easily be devised by those skilled in the art after reading this disclosure and that the scope of the present invention is to be determined by the following claims.

What is claimed:

1. A compression-molding method, the method utilizing a female mold, the female mold including a least one major feature having a long axis, and at least one minor feature, the method comprising:
disposing, in the female mold, at least one non-flowing continuous fiber bundle comprising first fibers and a first resin, wherein the at least one non-flowing continuous fiber bundle has a first length and aligns with the long axis; disposing, in the female mold, at least one flowing continuous fiber bundle at a first location that is proximal to the at least one minor feature, wherein the at least one flowing continuous fiber bundle comprises second fibers and a second resin, and has a second length that is less than 50 percent of the first length; and flowing, from the first location to a second location that is at least partially within the at least one minor feature, the second fibers and the second resin in an amount sufficient to fill the one minor feature, and wherein the second fibers in the one minor feature are substantially aligned to one another.

2. The method of claim 1 wherein at least one of the non-flowing continuous fiber bundle and the flowing continuous fiber bundle comprises towpreg.

3. The method of claim 1 wherein disposing at least one flowing continuous fiber bundle in the female mold further comprises determining a desired amount of fiber overlap, in a fiber-composite part to be fabricated, between the second fibers that flowed to the second location and the first fibers from the non-flowing continuous fiber bundle.

4. The method of claim 3 wherein the desired amount of overlap is at least 10 percent of the length of the at least one minor feature.

5. The method of claim 3 wherein the desired amount of overlap is at least 20 percent of the length of the at least one minor feature.

6. The method of claim 1 wherein a volume of the at least one flowing continuous fiber bundle disposed in the female mold exceeds a volume of the at least one minor feature by at least 10 percent.

7. The method of claim 1 wherein the at least one major feature is selected from the group consisting of a beam and a flat-planar region.

8. The method of claim 7 wherein the at least one minor feature is selected from the group consisting of a ring and a member having a u-shape.

9. The method of claim 1 wherein the at least one major feature comprises two beams arranged in an x-shape, and the at least one minor feature is a curved member that extends in an orthogonal direction to a major surface of the beams.

10. The method of claim 1 wherein a volume of the non-flowing continuous fiber bundles disposed in the female mold is greater than a volume of the flowing continuous fiber bundles disposed in the female mold.

11. The method of claim 1 further comprising disposing a preform in the at least one minor feature before bringing a male mold and the female mold in contact with one another, wherein the preform is physically adapted to increase a hoop strength of the minor feature relative to a hoop strength thereof in the absence of the preform.

12. The method of claim 11 wherein the minor feature has a first shape, and the preform has the first shape.

13. The method of claim 1 wherein the resin comprises thermoplastic.

14. The method of claim 1 wherein fiber in the non-flowing continuous fiber bundle and fiber in the flowing continuous fiber is carbon fiber.

15. The method of claim 1 wherein an aspect ratio of width to thickness of the at least one non-flowing continuous fiber bundle and the at least one flowing continuous fiber bundle is in a range of about 0.25 to about 6.

16. The method of claim 1 further comprising:
bringing a male mold and the female mold into contact with one another, wherein, during such contact, the non-flowing and flow continuous fiber bundles are compressed and heated; and
after a period of time dictated by a resin used in conjunction with the non-flowing and flowing continuous fiber bundles, separating the male and female molds and removing a fiber-composite part.

17. The method of claim 1 wherein flowing the second fibers and second resin further comprises applying heat and pressure thereto.

18. The method of claim 1 wherein a portion of the second length of the second fibers that flowed to the second location extends beyond the minor feature, intermingling with the first fibers from the non-flowing continuous fiber bundle, which remain in the major feature.

19. The method of claim 18 wherein, said portion substantially aligns with the first fiber from the non-flowing continuous fiber bundle.

20. The method of claim 1 wherein, to enter the minor feature, second fibers flow transversely with respect to the long axis of the major feature.

21. The method of claim 1 wherein, to enter the minor feature, second fibers flow out-of-plane with respect to the major feature.

22. The method of claim 1 wherein one or both of the first fibers and first resin in the non-flowing continuous fiber bundle is different than the second fibers and second resin in the flowing continuous fiber bundle.

23. The method of claim 1 wherein the first resin and the second resin have the same composition.

24. The method of claim 1 wherein the first fibers and the fibers comprise the same material.

25. The method of claim 1 further comprising disposing a preform in the at least one minor feature, wherein the preform increases an ability of the minor feature to withstand a stress compared to the ability thereof to do so in the absence of the preform.

26. A compression-molding method, the method utilizing a female mold, the female mold including a least one major feature and at least one minor feature, the method comprising:
disposing, in the female mold, at least one non-flowing continuous fiber bundle comprising resin and first fibers, wherein the at least one non-flowing continuous fiber bundle aligns with a long axis of the major feature and has a length approximately equal thereto;
disposing, in the female mold, at least one flowing continuous fiber bundle at a first location proximal to the at least one minor feature, wherein the at least one flowing continuous fiber bundle comprises resin and second fibers; and
flowing, in an amount sufficient to fill the one minor feature, the second fibers and resin of the at least one flowing continuous fiber bundle from the first location into the at least one minor feature, wherein the second fibers in the one minor feature are substantially aligned to one another.

27. The method of claim 26 wherein the at least one non-flowing continuous fiber bundle and the at least one flowing continuous fiber bundle each comprise a segment of towpreg.

28. The method of claim 26 wherein flowing further comprises:
applying heat and pressure to the flowing continuous fiber bundle; and
reducing a pressure in the minor feature relative to a pressure in the major feature.

29. The method of claim 26 wherein flowing further comprises changing an alignment of the second fibers from a first alignment, prior to flowing, which aligns with the long axis of the major feature, to a second alignment when the second fibers are in the at least one minor feature.

\* \* \* \* \*